United States Patent
Kim et al.

(10) Patent No.: US 12,006,613 B2
(45) Date of Patent: Jun. 11, 2024

(54) LAUNDRY TREATMENT DEVICE

(71) Applicant: LG ELECTRONICS INC., Seoul (KR)

(72) Inventors: Myungsang Kim, Seoul (KR); Hyunsang Kim, Seoul (KR); Yoosool Yoon, Seoul (KR); Cheolyeon Lee, Seoul (KR); Hoyong Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 449 days.

(21) Appl. No.: 17/442,740

(22) PCT Filed: Apr. 4, 2019

(86) PCT No.: PCT/KR2019/003997
§ 371 (c)(1),
(2) Date: Sep. 24, 2021

(87) PCT Pub. No.: WO2020/196974
PCT Pub. Date: Oct. 1, 2020

(65) Prior Publication Data
US 2022/0220651 A1 Jul. 14, 2022

(30) Foreign Application Priority Data
Mar. 26, 2019 (KR) .................. 10-2019-0034687

(51) Int. Cl.
*D06F 34/05* (2020.01)
*D06F 34/10* (2020.01)
*D06F 34/20* (2020.01)
*D06F 34/28* (2020.01)
*D06F 37/10* (2006.01)
(Continued)

(52) U.S. Cl.
CPC .............. *D06F 34/05* (2020.02); *D06F 34/10* (2020.02); *D06F 34/20* (2020.02); *D06F 34/28* (2020.02); *D06F 37/10* (2013.01); *D06F 37/18* (2013.01); *D06F 37/28* (2013.01); *D06F 39/14* (2013.01); *H02J 50/10* (2016.02); *H02J 50/80* (2016.02)

(58) Field of Classification Search
CPC ..................................................... D06F 34/05
See application file for complete search history.

(56) References Cited

U.S. PATENT DOCUMENTS

2018/0291547 A1 10/2018 Moon et al.

FOREIGN PATENT DOCUMENTS

| JP | H08-084891 | 4/1996 |
| JP | H08-215478 | 8/1996 |

(Continued)

OTHER PUBLICATIONS

International Search Report dated Dec. 23, 2019 issued in Application No. PCT/KR2019/003997.

*Primary Examiner* — Jason Y Ko
(74) *Attorney, Agent, or Firm* — KED & ASSOCIATES, LLP

(57) ABSTRACT

A laundry treatment device according to an aspect of the present invention comprises: a body which receives laundry therein and has an inlet through which the laundry is introduced; a door connected to the body, and opening or closing the inlet; a control panel provided on the door to receive, from a user, an input of an operation signal for treating the laundry; a power transmitter provided on the body to transmit wireless power; and a power receiver provided on the door to receive the wireless power and transmit same to the control panel.

20 Claims, 13 Drawing Sheets

(51) Int. Cl.
*D06F 37/18* (2006.01)
*D06F 37/28* (2006.01)
*D06F 39/14* (2006.01)
*H02J 50/10* (2016.01)
*H02J 50/80* (2016.01)

(56) References Cited

FOREIGN PATENT DOCUMENTS

| | | |
|---|---|---|
| KR | 10-2005-0066517 | 6/2005 |
| KR | 10-2012-0108472 | 10/2012 |
| KR | 10-2016-0084325 | 7/2016 |
| KR | 10-2019-0021743 | 3/2019 |

LAUNDRY TREATMENT DEVICE

CROSS-REFERENCE TO RELATED PATENT APPLICATIONS

This application is a U.S. National Stage Application under 35 U.S.C. § 371 of PCT Application No. PCT/KR2019/003997, filed Apr. 4, 2019, which claims priority to Korean Patent Application No. 10-2019-0034687, filed Mar. 26, 2019, whose entire disclosures are hereby incorporated by reference.

TECHNICAL FIELD

The present invention relates to a laundry treatment device.

BACKGROUND ART

In general, a laundry treatment device is a home appliance for washing or drying laundry including clothes. For example, the laundry treatment device may include a washing machine and a dryer.

Also, the laundry treatment device may be classified into a top loading type laundry treatment device in which a laundry inlet is provided in a top surface thereof and a front loading type laundry treatment device in which a laundry inlet is provided is a front surface thereof. In the top loading type laundry treatment device, a rotation shaft of a drum for allowing the laundry to rotate is vertically disposed. In the front loading type laundry treatment device, a rotation shaft of a drum extends in a horizontal direction.

In the laundry treatment device, a manipulation portion is provided in a main body of the washing machine, and an electric wire body is provided inside the main body of the washing machine to supply power to the manipulation portion. As an example, Korean Patent Publication No. 10-2005-0066517 discloses a display panel and an injection mold for the display panel of the washing machine. According to the prior art, when a user loads laundry into a main body of the washing machine, there is a limitation that a manipulation portion is malfunctioned by the user's body.

Recently, to prevent the above-mentioned problems, a laundry treatment device provided with the manipulation portion in the door has been developed. As an example, Korean Patent Publication No. 10-2016-0084325 discloses a clothes treatment device and a door. In detail, a technique for manipulating a laundry treatment device in which a manipulation portion is provided in a door rotating with respect to a washing machine body and which is manipulated through the manipulation portion provided in the door is disclosed.

According to the prior art, an electric wire connecting the door and the washing machine body is required to supply power to the manipulation portion provided in the door. Since the electric wire connects the door to the washing machine body, when the door is opened or closed, the electric wire repeatedly moves to reduce durability of the electric wire, resulting in occurring an electrical limitation because the durability of the electric wire is reduced. In addition, since the electric wire connects the door to the washing machine body, it is difficult to separate the door from the washing machine body, thereby making it difficult to maintain the laundry treatment device.

DISCLOSURE OF THE INVENTION

Technical Problem

The present invention may provide a laundry treatment device capable of supplying power to a manipulation portion provided in a door.

The present invention may provide a laundry treatment device capable of efficiently supplying power to an manipulation portion provided in a door moving with respect to a washing machine body.

The present invention may provide a laundry treatment device capable of allow a washing machine body operating by manipulating a manipulation portion provided in a door.

Technical Solution

A laundry treatment device according to the present invention may provide a control panel in a door that opens or closes a body, in which laundry is accommodated, and a power transmitter and a power receiver are provided in the door and the body to supply wireless power to the control panel provided in the door so that the control panel operates.

In the laundry treatment device according to the present invention, an electric wire configured to connect the door to the body so as to supply the power to the control panel provided in the door may be removed to prevent durability of the electric wire from being reduced by an opening or close of the door.

In the laundry treatment device according to the present invention, a manipulation signal may be input from the control panel provided in the door, and a communication portion may be provided in the door and the body to allow the body to receive the manipulation signal so as to operate so that the operation of the body is controlled by the control panel provided in the door to operate.

The laundry treatment device according to the present invention may be configured to separate the door from the body, thereby facilitating maintenance thereof.

Advantageous Effects

According to the present invention, the power may be stably supplied to the control panel provided in the door by the power receiver and power transmitter, which are provided to the door and the body.

According to the present invention, even when the door moves with respect to the body, the power may be smoothly transmitted to the control panel provided in the door.

According to the present invention, since the power receiver provided in the door and the power transmitter provided in the body are separated from each other, the maintenance of the laundry treatment device may be facilitated.

According to the present invention, the door and the body may communicate with each other to quickly transmit the manipulation signal of the control panel to the body.

According to the present invention, since the control panel is provided in the door, the control panel may be prevented from unnecessarily operating by the user's body.

MODE FOR CARRYING OUT THE INVENTION

Figure 1:
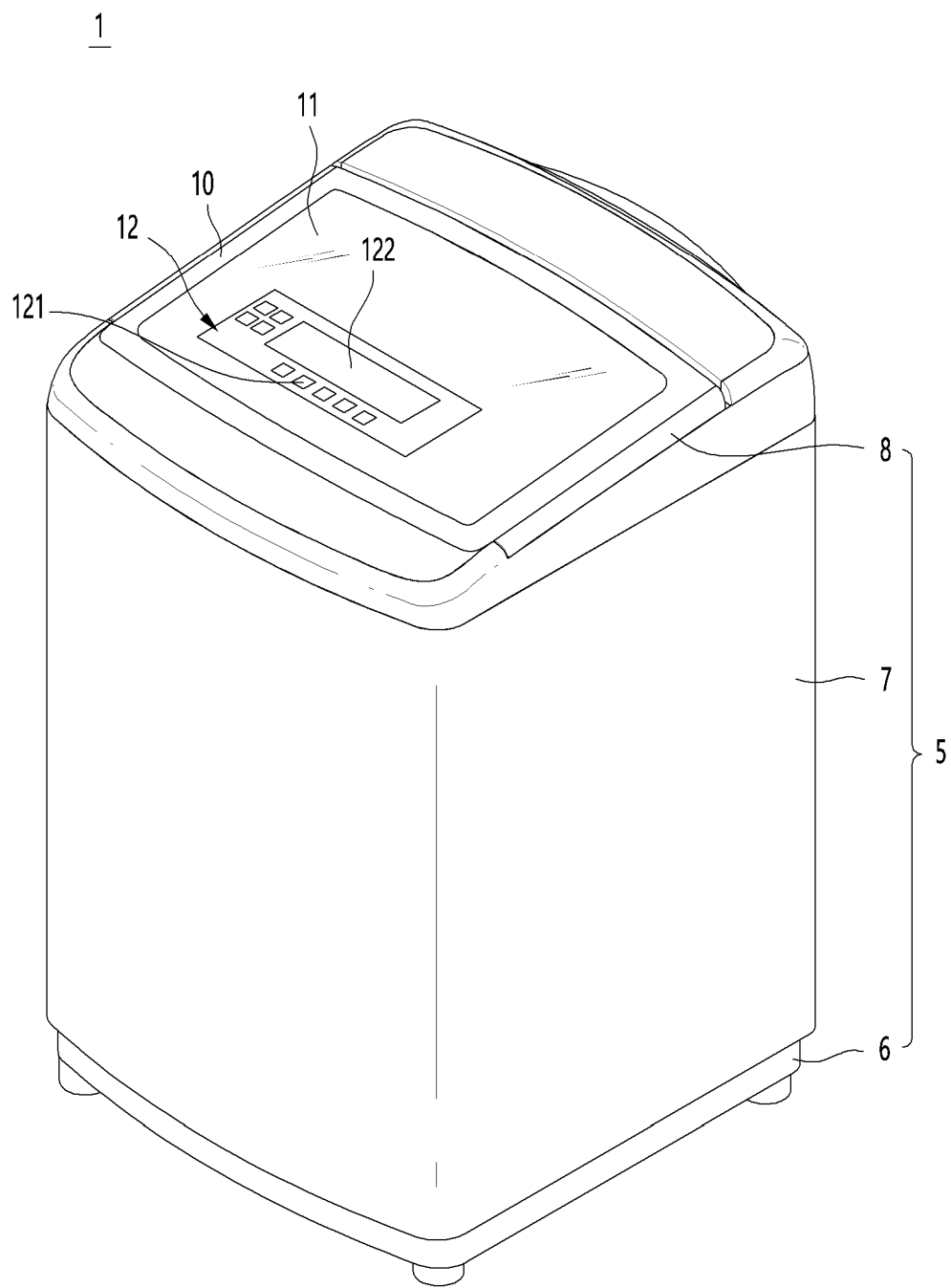
FIGS. 1 and 2 are perspective views of a laundry treatment device according to a first embodiment of the present invention.

Hereinafter, some embodiments of the present invention will be described in detail with reference to the accompanying drawings. Exemplary embodiments of the present invention will be described below in more detail with reference to the accompanying drawings. It is noted that the same or similar components in the drawings are designated by the same reference numerals as far as possible even if they are shown in different drawings. In the following description of the present invention, a detailed description of known functions and configurations incorporated herein will be omitted to avoid making the subject matter of the present invention unclear.

Also, in the description of the embodiments of the present disclosure, the terms such as first, second, A, B, (a) and (b) may be used. The terms are merely used to distinguish the corresponding component from other components, and do not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
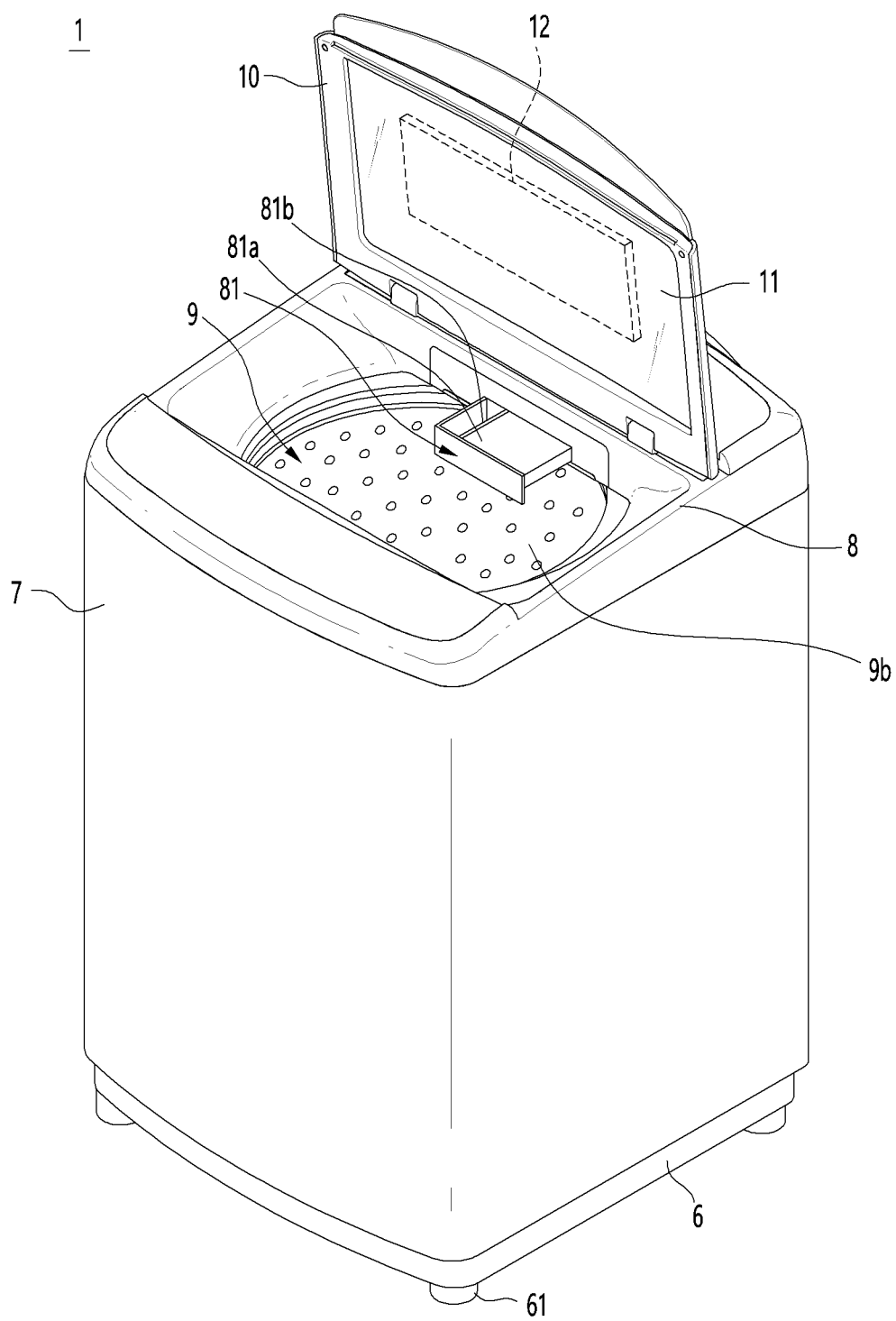
Figure 3:
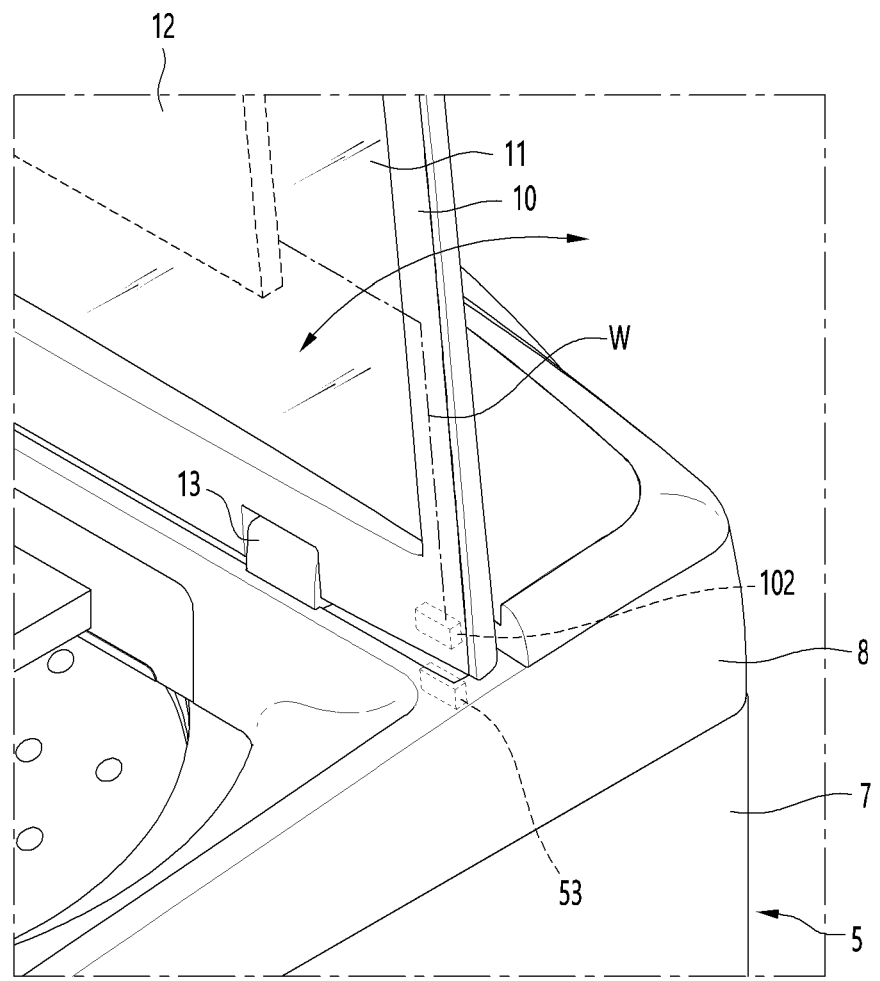
FIG. 3 is a perspective view illustrating a main portion of the laundry treatment device according to the first embodiment of the present invention.

FIGS. 1 and 2 are perspective views of a laundry treatment device according to a first embodiment of the present invention, and FIG. 3 is a perspective view illustrating a main portion of the laundry treatment device according to the first embodiment of the present invention.

Referring to FIGS. 1 to 3, a laundry treatment device 1 according to a first embodiment of the present invention may include a body 5. The body 5 may include a base 6, a cabinet 7, and a top cover 8.

The base 6 may be provided in a flat shape corresponding to the bottom on which the laundry treatment device 1 is installed. The base 6 may be supported on the bottom by four support legs 61 installed near four corners of the cabinet 7. A drain pump (not shown) may be installed on the base 6.

The cabinet 7 stands upright on a top surface of the base 6 and has a front surface, a rear surface, and left and right surfaces to define an accommodation space therein. The top surface of the cabinet 10 may be opened.

The top cover 8 may be coupled to an opened upper end of the cabinet 7. The top cover 8 may be provided with an inlet for loading or unloading laundry (or "cloths").

A dispenser 81 for supplying an additive acting on the laundry together with water to a water tub 9 to be described later may be provided in the top cover 8. The additive supplied by the dispenser 81 may include a detergent, a fabric softener, and the like. The dispenser 81 may include a detergent accommodation part 81a that supplies the detergent together with the water and a fabric softener accommodation part 81b that supplies the fabric softener together with the water.

The water tub 9 may be disposed inside the cabinet 7. The water tub 9 may include an outer tub (not shown) and an inner tub 9b. The outer tub (not shown) may be understood as a configuration for containing water in the cabinet 7. The outer tub may be fixed in a hung state within the cabinet 7. In addition, a suspension (not shown) for buffering vibration that may be generated in the outer tub may be further provided.

The inner tub 9b may be disposed inside the outer tub. The laundry is accommodated in the inner tub 9b to rotate about a vertical axis of the outer tub. A plurality of holes through which water passes may be defined in the inner tub 9b. The inner tub 9b and the outer tub may be fluidly connected to each other through the holes.

A pulsator (not shown) may be rotatably provided on an inner bottom of the inner tub 5. The pulsator may include a plurality of radial ribs that protrude upward. When the pulsator rotates, a water stream may be formed by the ribs.

A washing motor (not shown) providing power for rotating the inner tub 5 and the pulsator may be disposed in the cabinet 1. The washing motor may be mounted on a bottom surface of the outer tub.

A rotation shaft of the washing motor may be always coupled to the pulsator and selectively coupled to the inner tub 5 according to a switching operation of a clutch (not shown). Thus, when the rotation shaft of the washing motor is operated in the state of being coupled to the inner tub 5, the pulsator and the inner tub 5 may integrally rotate. Also, in a state in which the rotation shaft of the washing motor is separated from the inner tub 5, only the pulsator 15 rotates in a state in which the inner tub 5 is stopped.

The laundry treatment device 1 may further include a drain configuration that discharges water from the outer tub to the outside. The drain configuration may include a bellows (not shown), a drain valve (not shown), a drain pump (not shown), and the like. The washing water may be drained to the outside of the laundry treatment device 1 by an operation of the drain configuration.

The laundry treatment device 1 may include a door 10. The door 10 may open or close the inlet of the top cover 8. The door 10 may be rotatably coupled to the top cover 8. The door 10 and the top cover 8 may be rotatably connected to each other by a hinge portion 13.

The door 10 may include a transparent structure 11. An opening for installing the transparent structure 11 may be defined in the door 10. The transparent structure 11 may be fixed to the opening of the door 10. The transparent structure 11 may allow the laundry accommodated in the inner tub 9b to be visible to the user in a state in which the door 10 closes the inlet. The user may directly check a laundry state with the user's eyes by using the transparent structure 11.

The door 10 may include a control panel 12. The user may manipulate the laundry treatment device 1 through the control panel 12. In this embodiment, the control panel 12 may be provided in the transparent structure 11. Alternatively, the control panel 12 may be provided at one side of the door 10.

The control panel 12 may be provided in the transparent structure 11 or may be provided in the transparent structure 11 as a watertight structure. For example, when the control panel 12 is provided in the transparent structure 11, after checking the state of the laundry accommodated in the inner tub 9b through the transparent structure 11 with the user's eyes, the operation of the laundry treatment device 1 may be controlled. In addition, since the control panel 12 is provided in the door 10, in the state in which the door 10 is opened, the laundry treatment device 1 may be prevented from operating. In addition, since the control panel 12 is provided in the door 10, a limitation in which the control panel 12 is pressed by the user's body to unnecessarily operate may be prevented. In addition, since the control panel 12 has the watertight structure, water may be prevented from being introduced into the control panel 12.

The control panel 12 may include an input portion 121 and a display portion 122. The input portion 121 may include a key, a button, a touch panel, etc. that is capable of setting, selecting, and adjusting various operation modes provided by the laundry treatment device 1. The user may manipulate the operation of the laundry treatment device 1 by manipulating the input portion 121. The display portion 122 may display various pieces of information including a driving state of the laundry treatment device, a response according to the selection of the driving mode, a warning, a notification, and the like. Also, the display part 122 may be provided in the form of a display panel such as a lamp, an LCD panel, an LED panel, and the like. In this embodiment, the control panel 12 may be provided as a touch type display panel in which the input portion 121 and the display portion 122 are integrated with each other.

The door 10 may include a power receiver 102 capable of receiving wireless power. In addition, the body 5 may include a power transmitter 53 that transmits the wireless power to the power receiver 102. The control panel 12 provided in the door 10 may be electrically connected to the power receiver 102 to operate by the wireless power transmitted from the power transmitter 53.

Figure 4:
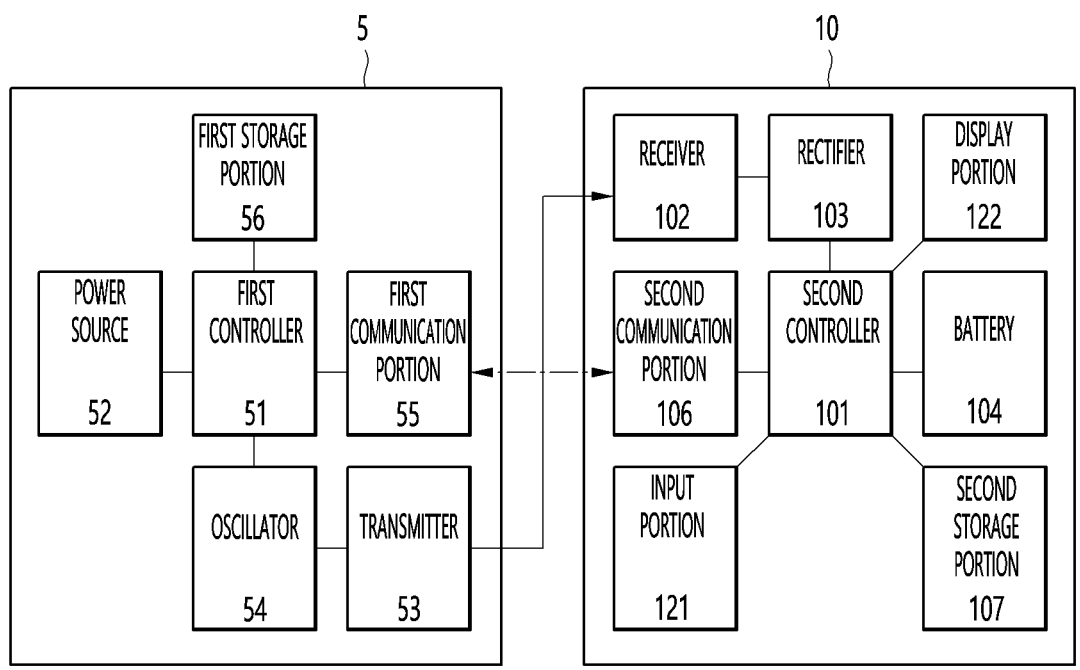
FIG. 4 is a view illustrating a configuration of the laundry treatment device according to the first embodiment of the present invention.

FIG. 4 is a view illustrating a configuration of the laundry treatment device according to the first embodiment of the present invention.

Referring to FIG. 4, the laundry treatment device 1 according to the present invention may include the body 5 and the door 10. Hereinafter, a configuration for supplying the wireless power to the control panel 12 provided in the door 10 will be described in detail.

Hereinafter, the body 5 will be described.

The body 5 may include a first controller 51. The first controller 51 may control an operation of the body 5. The first controller 51 may control an operation of the laundry treatment device 1 or may control an operation of the power transmitter 53 to be described later. In this embodiment, although the first controller 51 is described as controlling the function for transmitting the wireless power, but the first controller 51 may control the operation of the laundry treatment device 1.

The body 5 may include a power source 52. The power source 52 may be understood as a configuration for supplying power to the laundry treatment device 1. A portion of the power supplied to the power source 52 may be transmitted as the wireless power by the power transmitter 53, and the laundry treatment device 1 may operate by the remaining portion of the power supplied to the power source 52. The power source 52 may receive power from the outside to allow the laundry treatment device 1 to operate.

The body 5 may include a power transmitter 53. The power transmitter 53 may transmit the wireless power to the door 10. The power transmitter 53 may receive power from the power source 52 to transmit the received power as the wireless power. The configuration of the power transmitter 53 may be changed according to a wireless power supply method. For example, the power transmitter 53 may be provided as a coil, an antenna, a resonator, or the like. The power transmitter 53 may be manipulated by the first controller 51. In this embodiment, the power transmitter 53 may transmit the wireless power in a magnetic induction method or a magnetic resonance method.

The body 5 may include a power oscillator 54. The power oscillator 54 may change a frequency of the wireless power transmitted from the power transmitter 53. In this case, the frequency changed by the power oscillator 54 may be understood as a resonance frequency or the like. The wireless power changed in frequency to a specific frequency by the power oscillator 54 may be transmitted from the power transmitter 53 to the door 10. The first controller 51 may control the power oscillator 54 to transmit the wireless power changed in frequency to a specific frequency from the power transmitter 53. In this embodiment, it is referred to as the power oscillator, but may also be referred to as a power amplifier.

The body 5 may include a first communication portion 55. The first communication portion 55 may transmit and receive a plurality of pieces of information. The first communication portion 55 may be understood as a communication module for transmitting and receiving information. For example, the first communication portion 55 may receive operation information from the control panel 12 of the door 10. The body 5 may transmit information on an operation state of the laundry treatment device 1 to the first communication portion 55. That is, the first communication portion 55 may receive operation information from the control panel 12 of the door 10 to allow the laundry treatment device 1 to operate. In addition, the information on the operation state of the laundry treatment device 1 may be transmitted to the control panel 12 of the door 10 to display an operation state of the laundry treatment device 1 on the control panel 12.

The body 5 may include a first storage portion 56. The plurality of pieces of information may be stored in the first storage portion 56. The first controller 51 may control an operation of the body 5 based on the information stored in the first storage portion 56. The plurality of pieces of information stored in the first storage portion 56 include information for controlling the operation of the body 5, information for controlling the operation of the power transmitter 53, and frequency information of the wireless power transmitted from the power transmitter 53.

Hereinafter, the door 10 will be described.

The door 10 may be provided with the control panel 12. The door 10 may be provided with a configuration for driving the control panel 12. The control panel 12 may operate by a configuration provided in the door 10.

The door 10 may include a second controller 101. The second controller 101 may control an operation of the control panel 12. In detail, the second controller 101 may control operations of the input portion 121 and the display portion 122 of the control panel 12. The second controller 101 may control an operation of a configuration provided in the door 10. The second controller 101 may operate by the power transmitted from the power transmitter 53.

The door 10 may include the power receiver 102. The power receiver 102 may receive the wireless power transmitted from the power transmitter 53. A configuration of the power receiver 102 may be changed according to a wireless power supply method. For example, the power receiver 102 may be provided as a coil, an antenna, a resonator, or the like. The power receiver 102 may be manipulated by the second controller 101. In this embodiment, the power receiver 102 may receive the wireless power in a magnetic induction method or a magnetic resonance method.

The door 10 may include a power rectifier 103. The power rectifier 103 may rectify the wireless power received from the power receiver 102. The power rectifier 103 may rectify the wireless power, which is changed in frequency, into power capable of being used in the control panel 12. The power rectified by the power rectifier 103 may be consumed by the control panel 12.

The door 10 may include a battery 104. The battery 104 may be charged by the power rectified by the power rectifier 103. The battery 104 may store power for the operation of the control panel 12. The battery 104 may be charged by the wireless power transmitted from the power transmitter 53 and may function as an auxiliary power supply for supplying power to the control panel 12. The battery 104 may drive the operation of the control panel 12 by consuming the power of the battery 104 when the wireless power is not transmitted from the power transmitter 53. The battery 104 may provide standby power for the control panel 12 to prevent the control panel 12 from being stopped.

The door 10 may include a second communication portion 106. The second communication portion 106 may transmit and receive a plurality of pieces of information. The second communication portion 106 may be understood as a communication module for transmitting and receiving information. In this embodiment, the second communication portion 106 may transmit information on the control panel 12 to the first communication portion 55 of the body 5. In addition, the second communication portion 106 may receive the plurality of pieces of information transmitted from the first communication portion 55. The body 5 and the control panel 12 may communicate with each other by the first communication portion 55 and the second communication portion 106.

The door 10 may include a second storage portion 107. The plurality of pieces of information may be stored in the second storage portion 107. The second storage portion 107 may store information on the control panel 12, information on the operation of the control panel 12, information on the operation of the laundry treatment device 1, and the like. The second controller 101 may control the operation of the control panel 12 based on the information stored in the second storage portion 107. The plurality of pieces of information stored in the second storage portion 107 may be transmitted to the first communication portion 55 by the second communication portion 106. For example, when the input portion 121 of the control panel 12 operates, the second communication portion 106 may transmits the information about the operation input from the input portion 121 to the first communication portion 55 to allow the laundry treatment device 1 to operate. In addition, the second communication portion 106 may receive the operation state of the laundry treatment device 1 from the first communication portion 55, and the information on the operation state of the laundry treatment device 1 may be displayed on the display portion 122 of the control panel 12.

The control panel 12 may include the input portion 121 and the display portion 122. The input portion 121 may receive a manipulation signal from the user. The laundry treatment device 1 may operate based on a signal input through the input portion 121. For example, the input portion 121 may receive the manipulation signal from the user. The display portion 122 may display information according to a change in operation state of the laundry treatment device 1. For example, the display portion 122 may include an operation time, a remaining time, and an operation mode of the laundry treatment device 1.

The operation signal input through the input portion 121 may be transmitted from the door 10 provided with the control panel 12 to the body 5, and thus, the laundry treatment device 1 may be operate. Also, when the laundry treatment device 1 operates, the operation state of the laundry treatment device 1 may be displayed on the display portion 122 so that the user checks the operation state of the laundry treatment device 1.

According to the present invention, since the control panel 12 is provided in the door 10, the control panel 12 may move by movement of the door 10. In addition, since the door 10 is provided with the transparent structure 11, the inside of the body 5, in which the laundry is accommodated, may be quickly checked with the user's eyes, and then, the operation of the laundry treatment device 1 may be controlled. In addition, since the power transmitter 53 and the power receiver 102 for transmitting and receiving the wireless power are provided in the body 5 and the door 10 rotating with respect to the body 5, there is an advantage that an electric wire connecting the door 10 to the body 5 is not provided.

Figure 5:
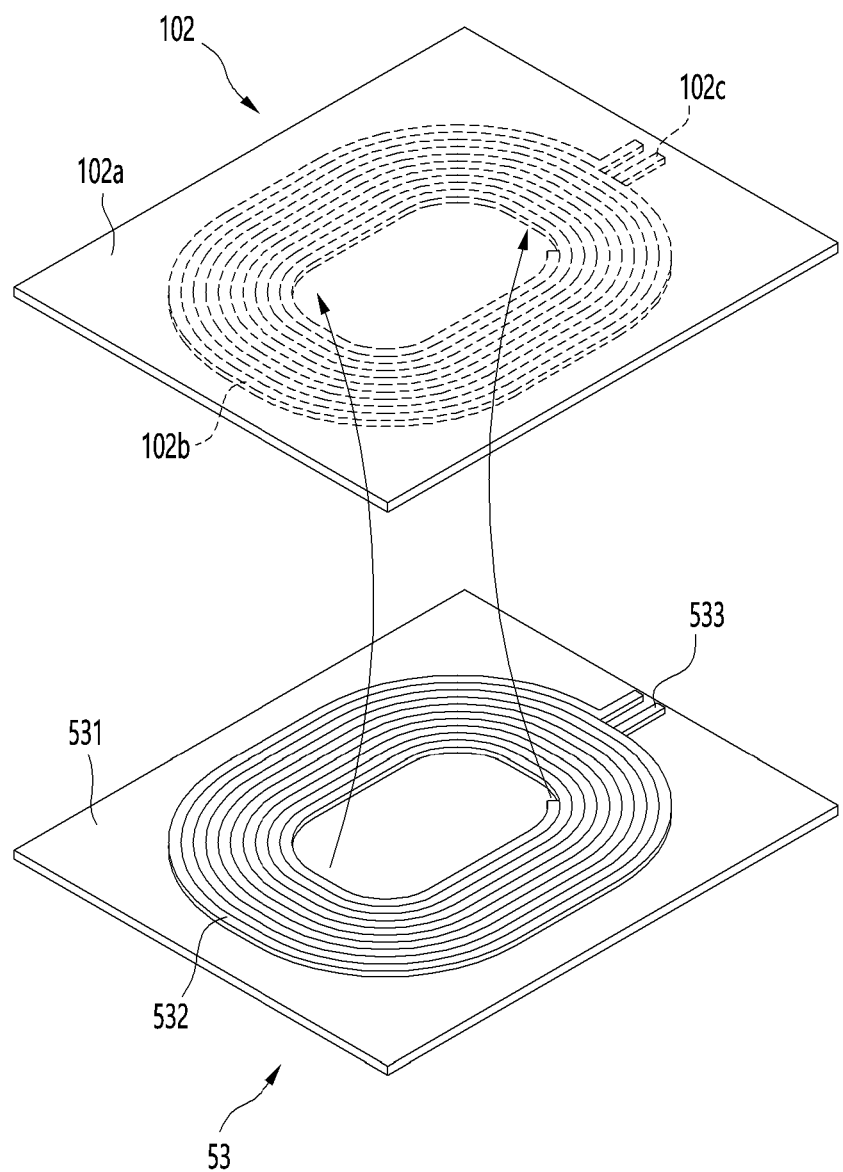
FIG. 5 is a view illustrating shapes of a power transmitter and a power receiver according to the first embodiment of the present invention.

FIG. 5 is a view illustrating shapes of the power transmitter and the power receiver according to the first embodiment of the present invention.

Referring to FIG. 5, the power transmitter 53 according to the present invention may be configured to transmit the wireless power. The power receiver 102 may be configured to receive the wireless power transmitted from the power transmitter 53. In this embodiment, the power transmitter 53 and the power receiver 102 may transmit/receive the wireless power in a magnetic induction method or a magnetic resonance method. In addition, the power transmitter 53 and the power receiver 102 are disposed to face each other, and the wireless power transmitted from the power transmitter 53 may be received by the power receiver 102. Hereinafter, structures of the power transmitter 53 and the power receiver 102 configured to transmit and receive the wireless power will be described. In this embodiment, each of the power transmitter 53 and the power receiver 102 may be provided in a coil structure. Here, the power transmitter 53 may be defined as a primary-side coil, and the power receiver 102 may be defined as a secondary-side coil. That is, the wireless power transmitted from the power transmitter 53 serving as the primary-side coil may be received by the power receiver 102 serving as the secondary-side coil.

The power transmitter 53 may include a first coil 532 and a first coil support 531. The first coil 532 may be provided in a state of being wound in a specific shape. For example, the first coil 532 may be supported by the first coil support 531 in a circularly wound state. The first coil 532 may be installed on the body 5 in a state of being supported by the first coil support 531. Also, the first coil 532 may be installed on the hinge portion 13 while being supported by the first coil support 531. A seating groove in which the first coil 532 is capable of being seated may be defined in the first coil support 531.

The power transmitter 53 may include a first terminal 533. The first terminal 533 may be defined as one end and the other end of the first coil 532 wound in the circular shape. The first terminal 533 may electrically connect the power transmitter 53 to the first controller 51. That is, electricity may be applied to the first coil 532 through the first terminal 533.

When current is applied to the first coil 532 of the power transmitter 53, electromagnetic fields may be generated in the first coil 532. The electromagnetic fields generated by the first coil 532 may cause electromotive force to be induced in the second coil 102*b* of the power receiver 102 to be described later. When the electromotive force is induced in the second coil 102*b*, a current flow is generated in the second coil 102*b*, and thus, power may be supplied from the power receiver 102.

The power receiver 102 may include a second coil 102*b* and a second coil support 102*a*. The second coil 102*b* may be provided in a state of being wound in a specific shape. For example, the second coil 102*b* may be supported by the second coil support 102*a* in a circularly wound state. The second coil 102*b* may be installed in the door 10 in a state of being supported by the second coil support 102*a*. In addition, the second coil 102*b* may be installed in the hinge portion 13 in a state of being supported by the second coil support 102*a*. A seating groove in which the second coil 102*b* is capable of being seated may be defined in the second coil support 102*a*.

The power receiver 102 may include a second terminal 102*c*. The second terminal 102*c* may be defined as one end and the other end of the second coil 102*b* wound in the circular shape. The second terminal 102*c* may electrically connect the power receiver 102 to the second controller 101. That is, electricity may be applied to the second controller 101 through the second terminal 102*c*.

The second coil 102*b* of the power receiver 102 may receive the electromagnetic fields generated by the first coil 532. When the electromagnetic fields are applied to the second coil 102*b*, electromotive force may be induced in the second coil 102*b*. When the electromotive force are induced in the second coil 102*b*, power may be applied to the power receiver 102. When the power receiver 102 moves away from the power transmitter 53, the electromagnetic fields are not received from the power transmitter 53 to the power receiver 102, and thus, the power supply may be stopped. When the power supply of the power receiver 102 is stopped, the second controller 101 may receive power from the battery 104.

Figure 6:
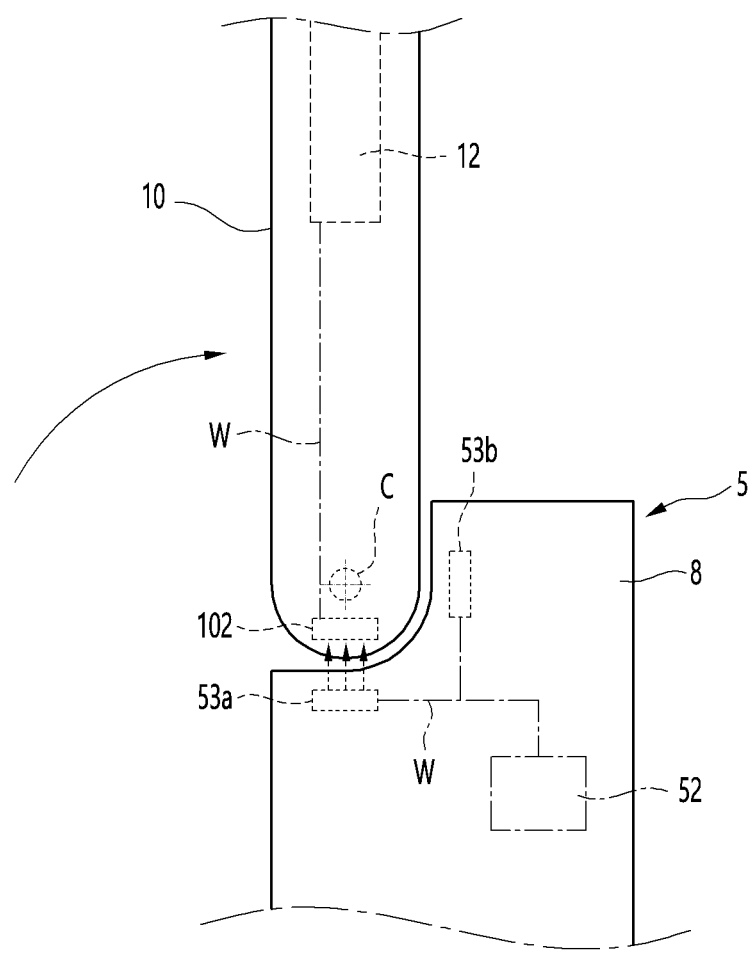
FIG. 6 is a view illustrating a state in which a door is closed according to the first embodiment of the present invention.
Figure 7:
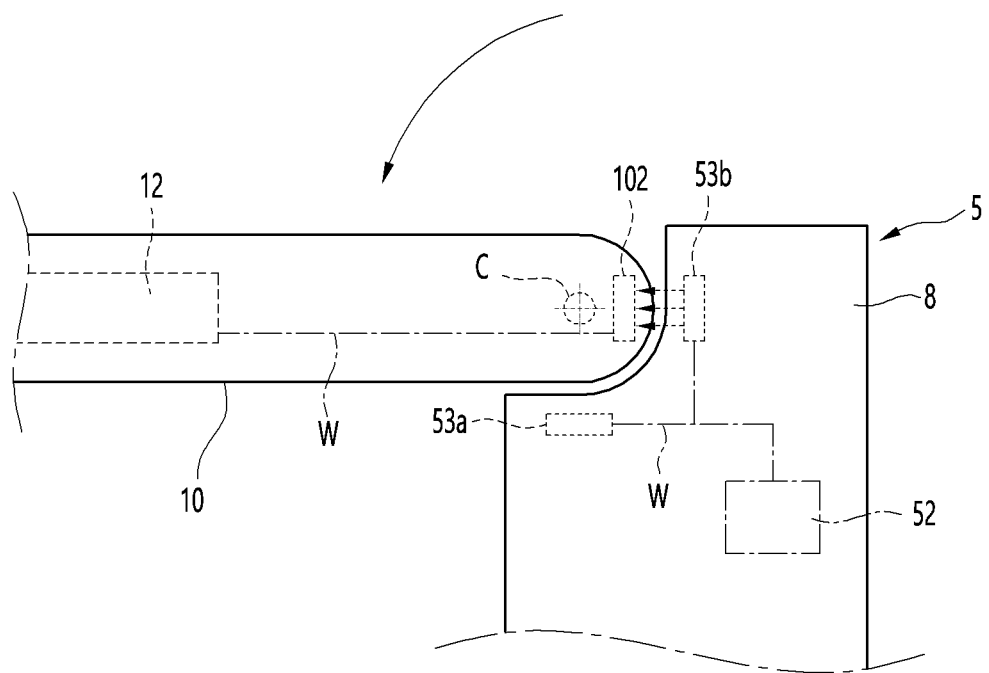
FIG. 7 is a view illustrating a state in which the door is opened according to the first embodiment of the present invention.

FIG. 6 is a view illustrating a state in which the door is closed according to the first embodiment of the present invention, and FIG. 7 is a view illustrating a state in which the door is opened according to the first embodiment of the present invention.

Referring to FIGS. 6 and 7, the door 10 of the laundry treatment device 1 according to the present invention may be provided with the control panel 12. The control panel 12 may move by movement of the door 10. After the door 10 is opened or closed, the user may manipulate the operation of the laundry treatment device 1 using the control panel 12.

The control panel 12 provided in the door 10 may operate by receiving the power from the body 5 of the laundry treatment device 1. In this embodiment, the body 5 may wirelessly transmits the power toward the door 10, and the door 10 may receive the wireless power transmitted to the body 5 to control the control panel 12.

In detail, the laundry treatment device 1 may include the power transmitter 53 and the power receiver 102. The power transmitter 53 may be provided in the body 5, and the power receiver 102 may be provided in the door 10. The door 10 may be provided to be rotatable with respect to the body 5 and be provided to be separable from the body 5, and thus, the power transmitter 53 and the power receiver 102 may be provided to the body 5 and the doors 10, respectively.

The power transmitter 53 and the power receiver 102 may be provided at one side of the door 10 and one side of the body 5, which are disposed adjacent to each other, respectively. For example, the power transmitter 53 and the power receiver 102 may be provided in one surface of the door 10 rotating with respect to the body 5 and one surface of the body 5 facing the one surface of the door 10. In this embodiment, at least one power transmitter 53 may be provided. The power transmitter 53 includes a first power transmitter 53*a* that transmits power to the power receiver 102 of the door 10 when the door 10 is opened, and a second transmitter 53*b* that transmits power to the power receiver 102 when the door 10 is closed. The first power transmitter 53*a* and the second power transmitter 53*b* may be provided as a single power transmitter 53. When the door 10 is opened, the first power transmitter 53*a* and the power receiver 102 may face each other. When the door 10 is closed, the second power transmitter 53*b* and the power receiver 102 may face each other. Also, the door 10 may further include a power transmitter 53 capable of transmitting power to the power receiver 102 when the door 10 rotates with respect to the body 5.

The power transmitter 53 and the power receiver 102 may be provided in a connection structure connecting the door 10 to the body 5. For example, the power transmitter 53 and the power receiver 102 may be provided in the hinge portion that rotatably connects the door 10 to the body 5.

The power transmitter 53 may transmit the wireless power from the body 5 toward the power receiver 102. The body 5 may include a power source 52 that supplies power to the power transmitter 53. The power source 52 may be understood as a configuration for supplying power to the laundry treatment device 1 and the power transmitter 53. The power transmitter 53 may transmit a portion of the power supplied from the power source 52 to the door 10 provided with the power receiver 102.

The power receiver 102 may receive the wireless power transmitted from the power transmitter 53. The power receiver 102 may be electrically connected to the control panel 12. For example, the power receiver 102 and the control panel 12 may be connected to each other by an electric wire W. When the wireless power is received by the power receiver 102, the received wireless power may be transmitted to the control panel 12. The control panel 12 may operate by the wireless power received by the power receiver 102.

In this embodiment, the power receiver 102 may be disposed at one side of the door 10. The one side of the door 10 at which the power receiver 102 is disposed may be defined as one side of the door 10 at which a rotation shaft C of the door 10 rotating with respect to the body 5 is disposed. In addition, the other side of the door 10 may be defined as the other side of the door 10 at which the handle is disposed.

The power transmitter 53 may be disposed at one side of the body 5 at which the rotation shaft C of the door 10 is fixed. In this embodiment, the rotating shaft C of the door 10 may be fixed to the top cover 8 of the body 5. The rotation shaft C may be understood as a rotation center in which the door 10 is fixed to one side of the body 5 to rotate. A portion of the power transmitter 53 and a portion of the power receiver 102 may face each other.

The door 10 may open and close the inlet of the body 5. The power transmitter 53 may transmit the wireless power to the power receiver 102 even when the door 10 is opened or closed. The power receiver 102 and the power transmitter 53 may transmit and receive the wireless power in the state of facing each other. When the power receiver 102 and the power transmitter 53 face each other, the wireless power transmitted from the power transmitter 53 may be received by the power receiver 102 in a state in which a loss is minimized.

According to the present invention, even when the door 10 rotates with respect to the body 5, the wireless power transmitted from the power transmitter 53 may be received by the power receiver 102. That is, the wireless power supplied from the body 5 to the door 10 may be prevented from being cut off. In addition, to supply power to the control panel 12, the electric wire connecting the door 10 to the body 5 may be removed. When the electric wire for connecting the door 10 to the body 5 is removed, the laundry treatment device 1 may be configured so that the door 10 is easily detached from the body 5. In addition, an electrical limitation that may be caused by moisture may be prevented by waterproofing a space between the door 10 and the body 5.

The power receiver 102 and the power transmitter 53 may be disposed to face each other according to whether the door 10 is opened. At least one of the power receiver 102 or the power transmitter 53 may be provided. The plurality of power receivers 102 and the plurality of power transmitters 53 may be disposed to be spaced apart from each other. When the door 10 is opened or closed, some of the plurality of power receivers 102 and some of the plurality of power transmitters 53 may face each other to transmit and receive the wireless power.

In this embodiment, the door 10 may be provided with one power receiver 102. The body 5 may be provided with a first power transmitter 53*a* and a second power transmitter 53*b*. When the door 10 is opened, the power receiver 102 and the first power transmitter 53*a* may face each other. When the door 10 is closed, the power receiver 102 and the second power transmitter 53*b* may face each other. When the first power transmitter 53*a* and the second power transmitter 53*b* and the power receiver 102 face each other, the wireless power may be transmitted. When the first power transmitter 53*a* and the second power transmitter 53*b* and the power receiver 102 do not face each other, power may be received from the battery 104 provided in the control panel 12.

Figure 8:
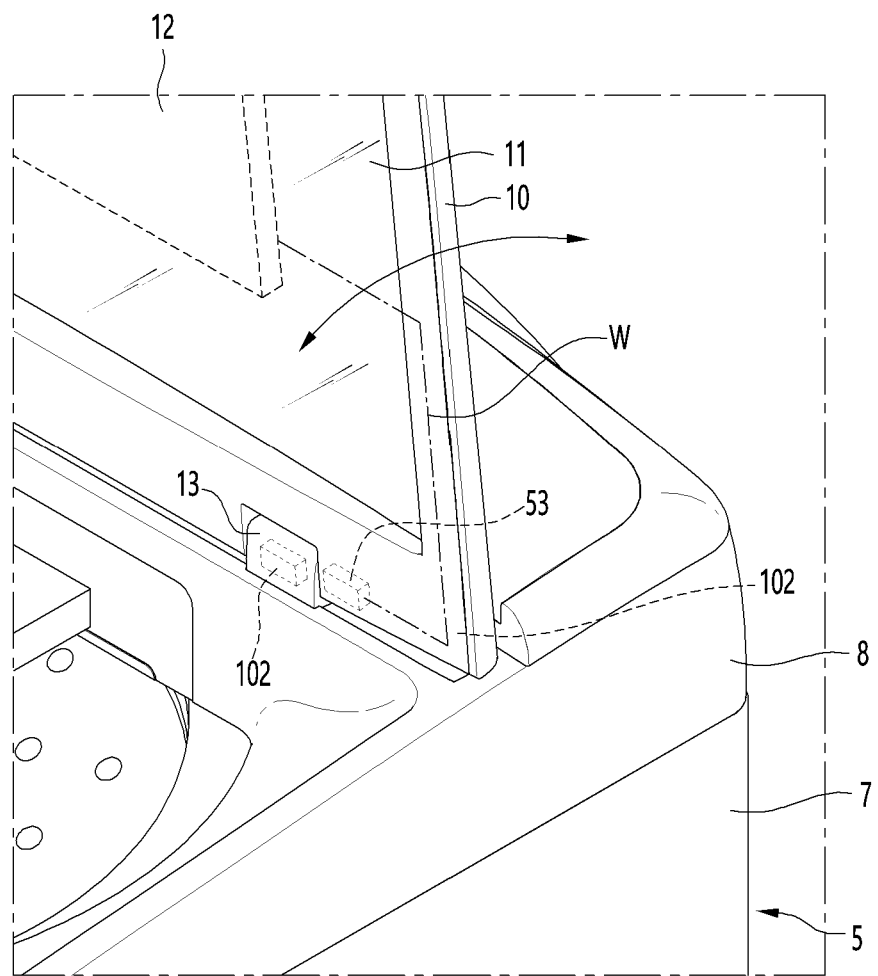
FIGS. 8 and 9 are perspective view illustrating a main portion of a laundry treatment device according to a second embodiment of the present invention.
Figure 9:
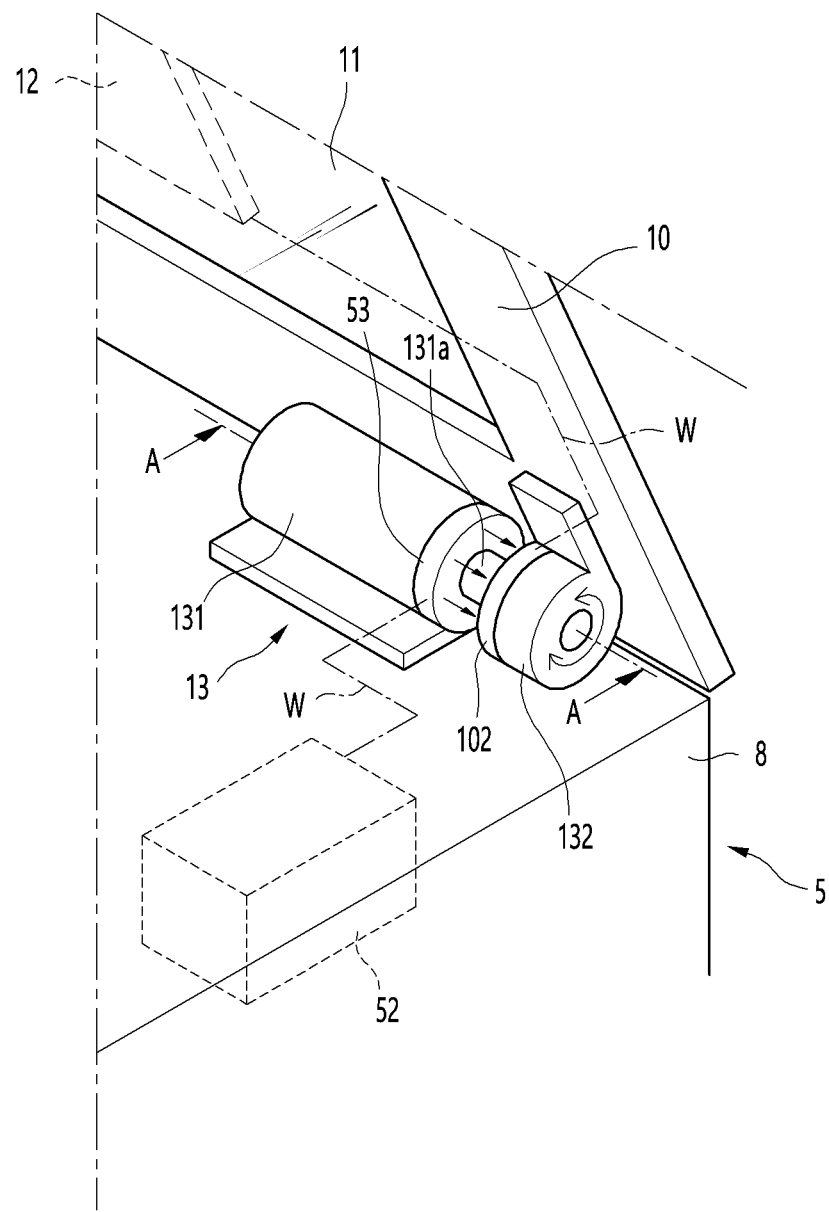
Figure 10:
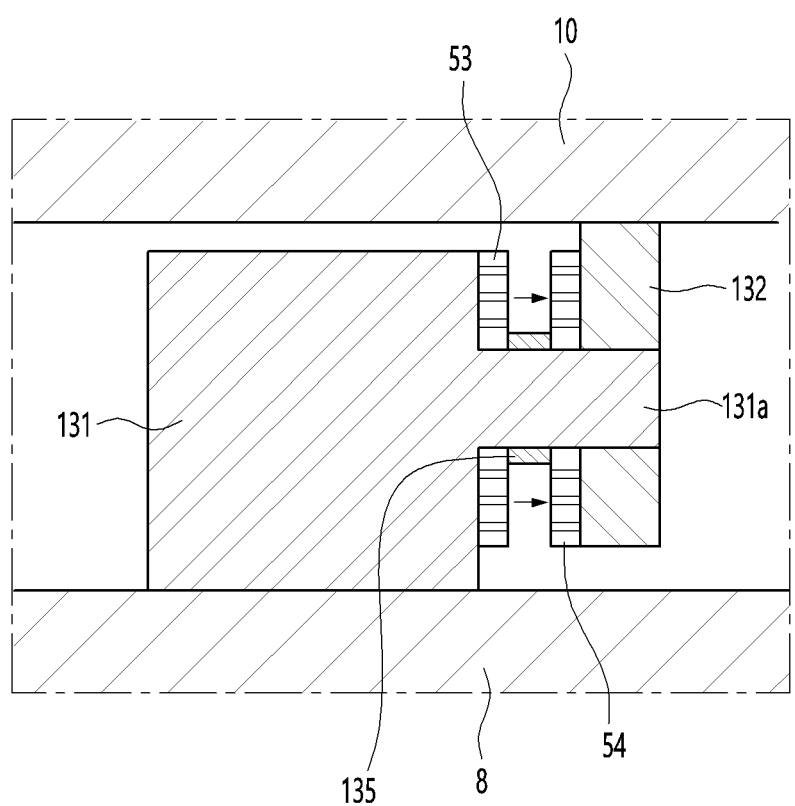
FIG. 10 is a cross-sectional view taken along line A-A of FIG. 9.

FIGS. 8 and 9 are perspective view illustrating a main portion of a laundry treatment device according to a second embodiment of the present invention, and FIG. 10 is a cross-sectional view taken along line A-A of FIG. 9.

A laundry treatment device according to a second embodiment is characterized in that a portion of the laundry treatment device according to the first embodiment is modified. Thus, a portion of the configuration of the laundry treatment device according to the second embodiment may be the same as that of the configuration of the laundry treatment device according to the first embodiment. Therefore, descriptions of some components of the laundry treatment device according to the second embodiment may be replaced with those of some components of the laundry treatment device according to the first embodiment.

Referring to FIGS. 8 to 10, the laundry treatment device according to the second embodiment of the present invention may include a hinge portion 13 connecting a door 10 to a body 5. One side of the hinge portion 13 may be connected to the door 10, and the other end of the hinge portion 13 may be connected to the body 5. In this embodiment, the other side of the hinge portion 13 may be connected to a top cover 8 of the body 5. The hinge portion 13 may allow the door 10 to rotate with respect to the body 5.

The hinge portion 13 may include a first hinge 131 and a second hinge 132. A portion of the first hinge 131 and the second hinge 132 may be rotatably connected to each other. The first hinge 131 may include a rotation shaft 131*a*. The second hinge 132 may be connected to the rotation shaft 131*a* to rotate. At least one hinge portion 13 may be provided between the body 5 and the door 10. The first hinge 131 may be fixed to the body 5, and the second hinge 132 may be fixed to the door 10.

The laundry treatment device according to the present invention may include a power receiver 102 and a power transmitter 53. In this embodiment, the power receiver 102 may be provided in the second hinge 132, and the power transmitter 53 may be provided in the first hinge 131. The power receiver 102 and the power transmitter 53 may be disposed to face each other. The first hinge 131 and the power transmitter 53 may be electrically insulated from each other. The second hinge 132 and the power receiver 102 may be electrically insulated from each other. Also, the first hinge 131 and the second hinge 132 may be electrically insulated from each other. The first hinge 131 and the second hinge 132 and the power receiver 102 and the power transmitter 53 may be configured to be electrically insulated from each other to prevent electrical short circuit from occurring in the hinge portion 13.

The power transmitter 53 may receive power from the body 5. The power transmitter 53 may be controlled by a first controller of the body 5. The power transmitter 53 may transmit wireless power to the power receiver 102.

The power receiver 102 may receive the wireless power transmitted from the power transmitter 53. The power received by the power receiver 102 may be transmitted to a control panel 12 provided in the door 10. The control panel 12 may operate by the power received from the power receiver 102. The power receiver 102 may be controlled by a second controller provided in the door 10.

In this embodiment, the power transmitter 53 may be provided at one side of the first hinge 131 facing the second hinge 132. The power receiver 102 may be provided at one side of the second hinge 132 facing the power transmitter 53. The power transmitter 53 and the power receiver 102 may be spaced apart from each other. That is, the wireless power transmitted from the power transmitter 53 may be received by the power receiver 102 even when the second hinge 132 rotates with respect to the first hinge 131.

A stopper 135 may be provided between the power transmitter 53 and the power receiver 102. The stopper 135 may be fixed to a rotation shaft 131*a*. The stopper 135 may allow the power transmitter 53 and the power receiver 102 to be spaced a regular interval from each other.

For example, the power transmitter 53 may be disposed in one surface of the first hinge 131 from which the rotation shaft 131*a* protrudes from the first hinge 131. The power receiver 102 is connected to the rotation shaft 131*a* and be disposed in one surface of the second hinge 132 facing one surface of the first hinge 131. The power receiver 102 and the power transmitter 53 may be disposed to be spaced a regular interval from each other. The wireless power transmitted from the power transmitter 53 may be received by the power receiver 102. The wireless power received by the power receiver 102 may be supplied to the control panel 12.

According to the present invention, the power transmitter 53 and the power receiver 102 are provided in the hinge portion 13 connecting the door 10 to the body 5 to supply the power to the control panel 12 provided in the door 10. Since an electric wire connecting the body 5 to the door 10 to supply power to the control panel 12 is not provided, an opening and closing of the door 10 is smooth, and thus, an opening range of the door 10 may be expanded. In addition, the hinge portion 13 may be detachably provided so that the door 10 and the body 5 are separated from each other. In addition, when the hinge portion 13 is coupled, the power may be supplied from the body 5 to the control panel 12 of the door 10.

Figure 11:
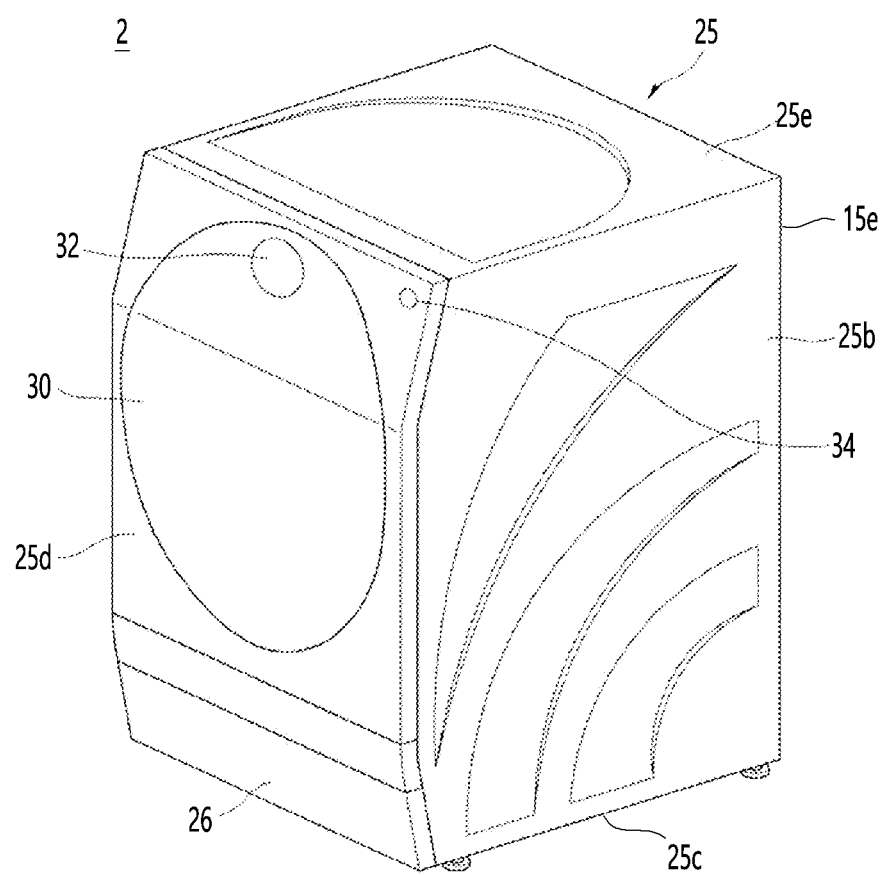
FIGS. 11 and 12 are perspective views of a laundry treatment device according to a third embodiment of the present invention.
Figure 12:
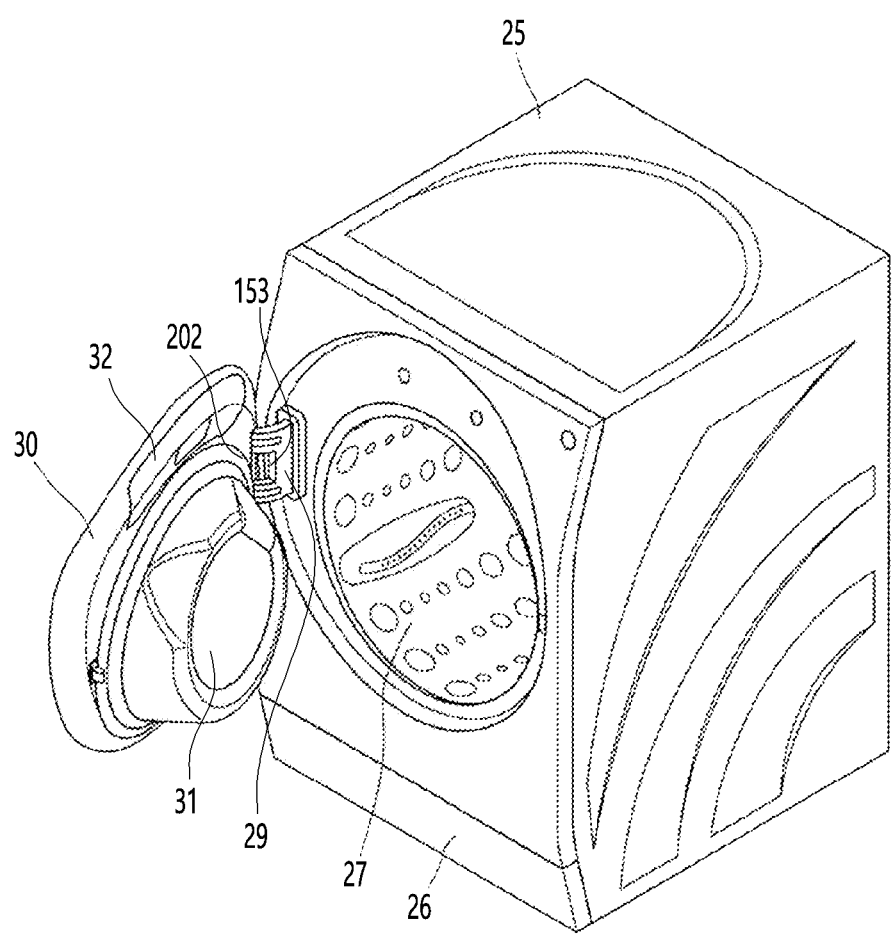
Figure 13:
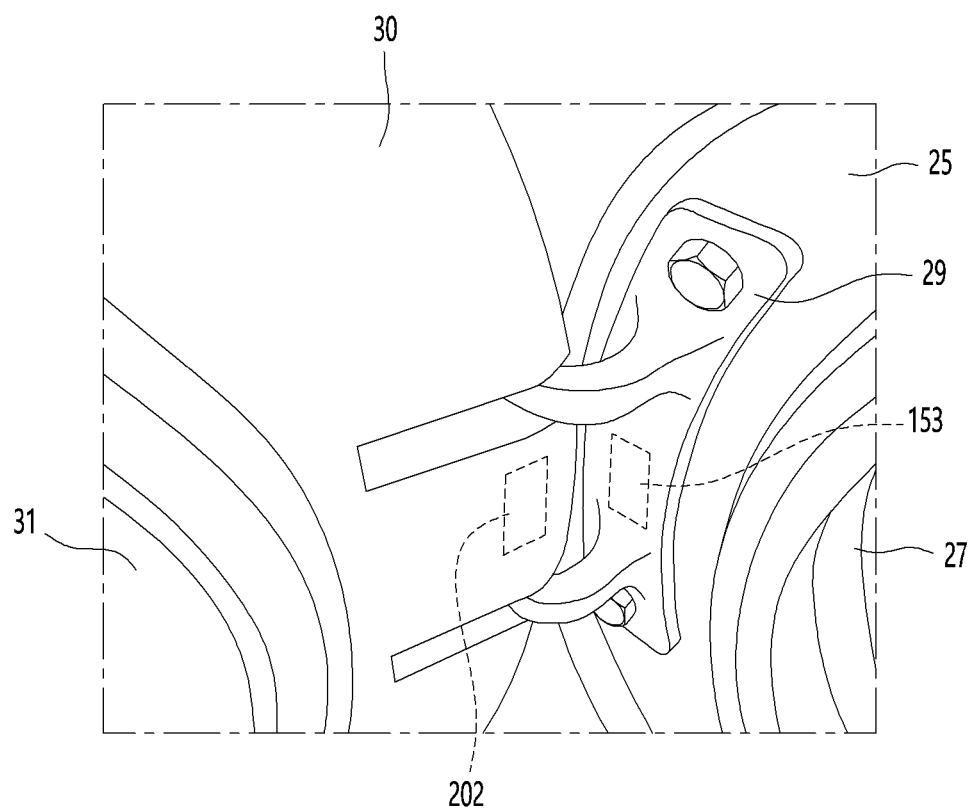
FIG. 13 is a view illustrating a main portion of the laundry treatment device according to the third embodiment of the present invention.

FIGS. 11 and 12 are perspective views of a laundry treatment device according to a third embodiment of the present invention, and FIG. 13 is a view illustrating a main portion of the laundry treatment device according to the third embodiment of the present invention.

A laundry treatment device according to a third embodiment is characterized in that a portion of the laundry treatment device according to each of the first and second embodiments is modified. Thus, a portion of the configuration of the laundry treatment device according to the third embodiment may be the same as that of the configuration of the laundry treatment device according to each of the first and second embodiments. Therefore, descriptions of some components of the laundry treatment device according to the third embodiment may be replaced with those of some components of the laundry treatment device according to each of the first and second embodiments.

Referring to FIGS. 11 to 13, a laundry treatment device 2 according to a third embodiment of the present invention may include a cabinet 25 having an outer appearance and an outer shape thereof.

The cabinet 25 may be provided in a hexahedral shape. The cabinet 25 includes a top cover 25a defining a top surface of the hexahedral shape, a side cover 25b defining each of both sides of the hexahedral shape, a base cover 25c defining a bottom surface of the hexahedral shape, a front cover 25d defining a front surface of the hexahedral shape, and a back cover 25e defining a rear surface of the hexahedral shape.

An inlet for loading laundry may be provided in the front cover 25d. A circular door 30 for opening or closing the inlet may be rotatably installed on the front cover 25d. One side of the door 30 may be coupled to a hinge portion 29, and the other side of the door 30 may rotate in a front and rear direction around the hinge portion 29. A push-type locking device is provided at the other side of the door 30, and when the other side of the door 30 is pushed once, the door 30 may be locked, and when the door 30 is pushed again, the door 30 may be unlocked.

A portion of the door 30 is provided as a transparent structure 31, and thus, laundry, which is washed, dehydrated, and dried, may be checked from an external space. An upper end of the door 30 is provided with a touch-type display portion 32 for user's manipulation so that an operation mode for performing washing, dehydrating, and drying operations is selected and switched. The touch-type display portion 32 may move by the door 30.

A drum 27 into which laundry is loaded through the inlet and which is rotatably mounted may be provided in the cabinet 25. A lifter may be installed on an inner circumferential surface of the drum 27, and when the drum 27 rotates, the laundry may ascend and descend by the lifter and thus be washed. The drum 27 may be selectively opened or closed by the door 30.

A power button 34 may be provided at an upper right side of the front cover 25d to turn on/off the power during the washing, dehydrating, and drying operations of the laundry treatment device 2.

A detergent supply portion may be installed in a lower portion of the cabinet 25 so as to be withdrawn and inserted in a drawer type, and a lower cover 26 covering the detergent supply portion may be installed to be rotatable in a vertical direction.

The laundry treatment device 2 according to the present invention may include a power transmitter 153 and a power receiver 202. The power transmitter 153 may be provided in the cabinet 25, and the power receiver 202 may be provided in the door 30. In addition, the power transmitter 153 may be provided in the hinge portion 29, and the power receiver 202 may be provided in the door 30. When the door 30 closes the cabinet 25, the power transmitter 153 and the power receiver 202 may face each other. Wireless power transmitted from the power transmitter 153 may be received by the power receiver 202. In this embodiment, the power transmitter 153 may be disposed at one side of the hinge portion 29, and the power receiver 202 may be disposed at the other side of the hinge portion 29. Here, the one side of the hinge portion 29 may be defined as a portion of the hinge portion 29 fixed to the cabinet 25, and the other side of the hinge portion 29 may be defined as a portion of the hinge portion 29 fixed to the door 30.

Also, in the present embodiment, although it is described that the power transmitter 153 and the power receiver 202 are provided in the hinge portion 29, the power transmitter 153 may be disposed at one side of the cabinet 25, and the power receiver 202 may be disposed at one side of the door 30 facing the power transmitter 153. That is, when the door 30 is closed, the power receiver 202 and the power transmitter 153 may face each other to transmit and receive the wireless power. In addition, when the door 30 is opened, the power receiver 202 receiving the wireless power transmitted from the power transmitter 153 may be further installed so that the wireless power is supplied even when the door 30 is opened.

The power transmitter 153 may receive power from the cabinet 25 and wirelessly transmit the power to the power receiver 202. Also, an operation of the power transmitter 153 may be controlled by a controller of the cabinet 25. The power receiver 202 may receive the wireless power transmitted from the power transmitter 153 and transmit the received wireless power to the touch-type display portion 32. The operation of the power transmitter 153 may be controlled by a controller of the touch-type display portion 32. A battery may be further provided in the touch-type display portion 32 and be charged by the wireless power received by the power receiver 202. When the power receiver 202 does not receive the wireless power from the power transmitter 153, the touch-type display portion 32 may operate using the power of the battery. The touch-type display portion 32 and the cabinet 25 may communicate with each other to transmit/receive information. When the touch-type display portion 32 operates by a user, the cabinet 25 may treat laundry based on an operation signal transmitted from the touch-type display portion 32.

The invention claimed is:

1. A laundry treatment device comprising:
 a body which has an inlet through which laundry is loaded, and in which the laundry is accommodated;
 a door connected to the body and configured to open or close the inlet;

a control panel provided in the door and configured to receive a manipulation signal for treating the laundry from a user;

a power transmitter provided in the body and configured to transmit wireless power; and a power receiver provided in the door and configured to receive the wireless power and transmit the received wireless power to the control panel.

2. The laundry treatment device according to claim 1, further comprising a hinge portion disposed at one side of the inlet and configured to connect the door to the body.

3. The laundry treatment device according to claim 2, wherein the hinge portion comprises:

a first hinge disposed at one side of the body; and a second hinge disposed at one side of the door and connected to be rotatable with respect to the first hinge.

4. The laundry treatment device according to claim 3, wherein the power transmitter is provided in the first hinge, and the power receiver is provided in the second hinge.

5. The laundry treatment device according to claim 1, wherein the power transmitter and the power receiver are disposed to face each other.

6. The laundry treatment device according to claim 5, wherein, when the door opens or closes the inlet, a portion of the power transmitter and a portion of the power receiver are disposed to face each other.

7. The laundry treatment device according to claim 1, wherein the door is rotatable with respect to the body.

8. The laundry treatment device according to claim 7, wherein the power receiver is disposed at one side of the door that rotates with respect to the body, and the power transmitter is disposed at one side of the body, which faces the one side of the door.

9. The laundry treatment device according to claim 1, wherein the body comprises:

a first controller configured to control an operation of the power transmitter;

a power source configured to supply power to the power transmitter;

a first communication portion configured to communicate with the control panel so as to transmit and receive a plurality of pieces of information therebetween; and a first storage portion configured to store the plurality of pieces of information.

10. The laundry treatment device according to claim 9, wherein the door comprises:

a second controller configured to control an operation of the control panel;

a second communication portion configured to communicate with the first communication portion so as to transmit and receive a plurality of pieces of information therebetween; and a second storage portion configured to store the plurality of pieces of information.

11. The laundry treatment device according to claim 10, wherein the door further comprises a battery charged by the power transmitted from the power transmitter, wherein the battery is configured to supply standby power to the control panel.

12. The laundry treatment device according to claim 1, wherein the control panel comprises:

an input portion configured to receive the manipulation signal from the user; and a display portion configured to display a treated state of the laundry.

13. The laundry treatment device according to claim 1, wherein the door comprises a transparent structure configured to expose the laundry accommodated in the body to the outside, and the control panel is provided in the transparent structure or at one side of the door.

14. The laundry treatment device according to claim 1, wherein the laundry treatment device is divided into a top loading method, in which the inlet is provided in a front surface of the body or a front loading method, in which the inlet is provided in a top surface of the body.

15. A laundry treatment device comprising:

a body having an inlet through which laundry is loaded;

a door in which a control panel configured to receive a manipulation signal for treating the laundry is provided, the door being configured to open or close the inlet;

a power transmitter provided in the body and configured to supply power from the control panel; and a power receiver provided in the door and configured to receive the power supplied from the power transmitter and transmit the received power to the control panel, wherein, whether the power is transmitted from the power transmitter to the power receiver is determined according to the opening or closing of the door.

16. The laundry treatment device according to claim 15, further comprising a battery provided in the door and configured to supply additional power to the control panel.

17. The laundry treatment device according to claim 16, wherein, when the inlet is opened by the door, the power is not transmitted from the power transmitter to the power receiver, and the control panel operates by the battery.

18. The laundry treatment device according to claim 16, wherein, when the inlet is closed by the door, the power is transmitted from the power transmitter to the power receiver, and the control panel operates by the power, or the battery is charged.

19. The laundry treatment device according to claim 15, wherein the power transmitter is provided on one surface of the body, and the power receiver is provided on one surface of the door, which faces the one surface of the body.

20. The laundry treatment device according to claim 15, further comprising a hinge portion configured to connect the body to the door, wherein the power transmitter is provided at one side of the hinge portion, and the power receiver is provided at the other side of the hinge portion or one side of the door.

* * * * *